Oct. 18, 1927.

W. E. URSCHEL 1,645,835

AUTOMATIC ICE CREAM CUTTING AND COATING MACHINE

Filed Sept. 12, 1924

Oct. 18, 1927.  
W. E. URSCHEL  
1,645,835  
AUTOMATIC ICE CREAM CUTTING AND COATING MACHINE  
Filed Sept. 12, 1924   6 Sheets-Sheet 2

William E. Urschel Inventor

By N. S. Amstutz

Attorney

Patented Oct. 18, 1927.

1,645,835

UNITED STATES PATENT OFFICE.

WILLIAM E. URSCHEL, OF VALPARAISO, INDIANA, ASSIGNOR TO ESKIMO PIE CORPORATION, OF LOUISVILLE, KENTUCKY, A CORPORATION OF DELAWARE.

AUTOMATIC ICE-CREAM CUTTING AND COATING MACHINE.

Application filed September 12, 1924. Serial No. 737,335.

My invention relates to improvements in automatic ice cream cutting and coating machines, and it more especially consists of the features hereinafter pointed out in the annexed claims.

The purpose of my invention is to provide a self-contained machine of large capacity for automatically cutting blocks of ice cream into successive slabs or cross sections, and in thereafter dividing the same into two parts to form the nuclei of "Eskimo pies"; that automatically carries each of the parts away from the cutting position into a dipping pan where a coating of warm chocolate is applied; that automatically removes the coated portions of ice cream and passes them on toward the delivery positions slowly, so that the chocolate has time to set; that automatically delivers the completed pies to suitable carrying belts which are in continuous movement, thus serving to pass the finished product to operators who wrap it in tin foil coverings ready for the market; that makes provision for the easy dissembling of the parts which require washing etc.; and that provides interrelated mechanism which is relatively simple to perform the various repetitive functions without the use of inter-meshing gears etc., such as are commonly found in automatic devices.

With these and other ends in view, I illustrate in the accompanying drawings such instances of adaptation as will disclose the broad underlying features without limiting myself to the specific details shown thereon and described herein.

In practically carrying out my invention, I may use the specific expedients exemplified in the accompanying drawings or any substitutes found available among a multitude of alternative expedients.

The exemplifications instanced in the accompanying drawings are largely composed of duplicate elements because of a "two-in-one" function of the machine. Duplicate steps are continuously carried out by the mechanism which may be briefly described in consecutive order as follows: A rectangular block of ice cream is placed on an intermittently actuated belt which periodically moves the block of ice cream a predetermined distance under a transversely positioned cutting knife. This cutting knife in its downward movement separates a thin slab of ice cream from the main block. Before the transverse severing knife returns on its up stroke, a vertical dividing knife separates the slab into two independent portions of ice cream which form the centers or nuclei of what has come to be known as "Eskimo pies".

Before the two knives are withdrawn from the ice cream a pair of freely suspended transferring carriers having curved needles near their lower ends are automatically pushed into the separate portions of ice cream found on each side of the vertical dividing knife. These carriers now move forward circumferentially around two separate centers, over a short arc, when they are lowered so as to dip the portions of ice cream into a pan containing melted chocolate from which they are almost instantly raised again, and the carriers in their further circumferential travel are held at an angle so as to cause any drippings of the chocolate to take place at the lowest corners of the dipped ice cream. This pair of carriers, and those following in orderly sequence, travel over an arc of about 180 degrees, during which time the chocolate becomes more or less hardened.

When the completed "pies" in their circumferential travel have reached a point a little more than half way around their circular path from the dipping position, a pair of carriers with the attached pies are met by a series of stationary fingers, one group for each carrier. These fingers pass between the carriers, their needles and the supported pies, at which time the lower ends of the carriers are moved radially toward the center of rotation so as to withdraw the needles from the pie leaving the now freed pies to respectively rest upon a pair of continuously moving delivery belts, thus completing the cycle of operations for two pies.

In order to increase the capacity of the machine beyond what it would be if only two carriers were provided, a group of eighteen carriers are pivoted for vertical movement in a radial direction from duplicate heads positioned one on each side of the incoming ice cream. This relation of parts insures a continuous progression and production of pies, at the rate of three dozen for each revolution of the rotating heads.

The functions of the machine may be briefly summarized as follows:

1st. Intermittently moving the block of ice cream forward;

2nd. Cutting a slab from the front end of the ice cream;

3rd. Dividing the slab into two parts;

4th. Independently carrying the divided portions in circular paths;

5th. Dipping the parts into melted chocolate;

6th. Removing the dipped pies from the chocolate and solidifying the coating; and 7th. Depositing the finished product to a pair of belts which deliver them to operators for final wrapping in tin foil.

From the above, it will be seen that the successive sequence of operations is repeated for each portion of ice cream separated from the main block. In fact, these steps are so continuously sequential duplicates for successive pies that the entire operation, contrary to the apparent complication of the mechanism, is an exceedingly simple one.

In order to not complicate the drawings with a maze of reference numerals, these are restricted as much as possible to the more important cooperating structural features, without referring to all the little details, because these are self explanatory in the drawings and obvious to anyone skilled in the art.

Figures 1, 8, 9:
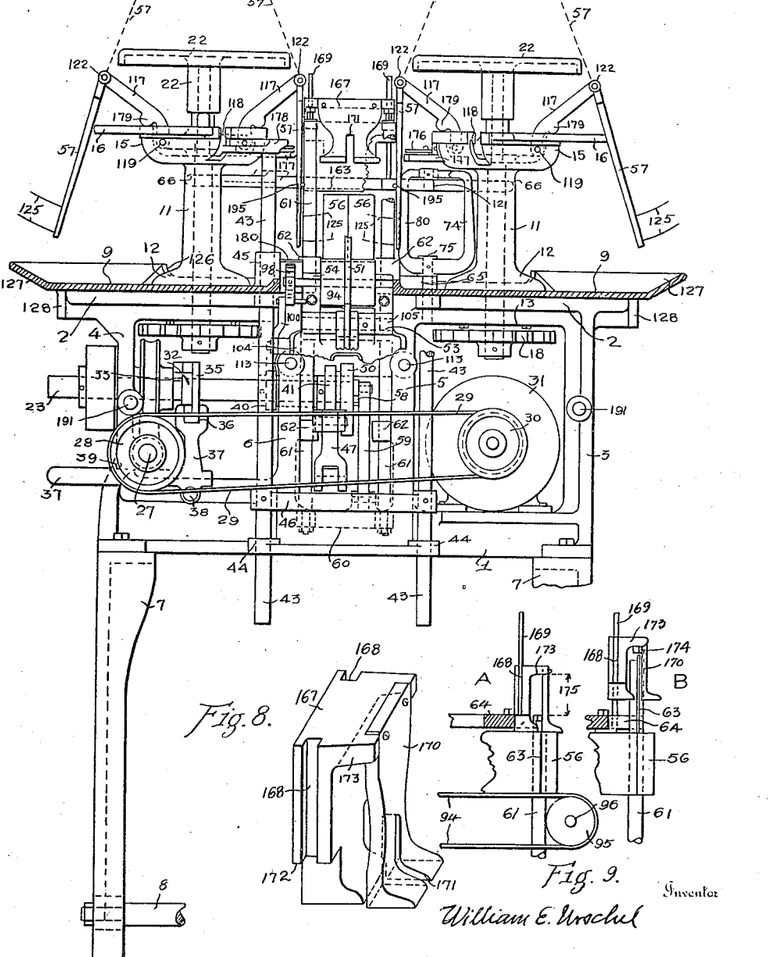
Figure 1 (Sheet 1) is a front elevation of the machine partly in section showing the dipping pan removed.
Fig. 8 (Sheet 1) is a perspective view of a sliding weight adapted to hold the severed portions of ice cream from adhering to the transverse severing knife as it moves upward.
Figs. 9, A and B, (Sheet 1) show the successive positions of the weight illustrated in Fig. 8.
Figure 4:
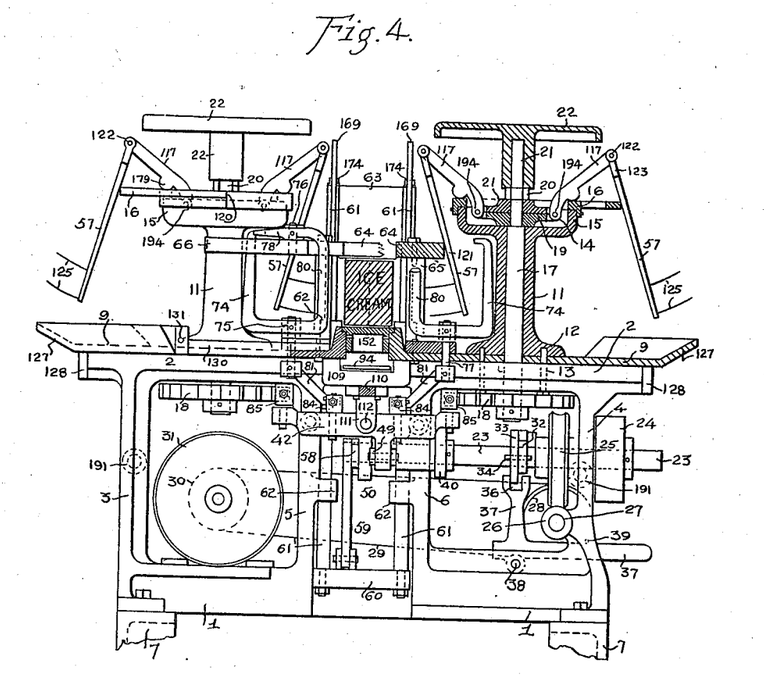
Fig. 4 (Sheet 3) is a rear elevation partly in section.
Figures 5, 12:
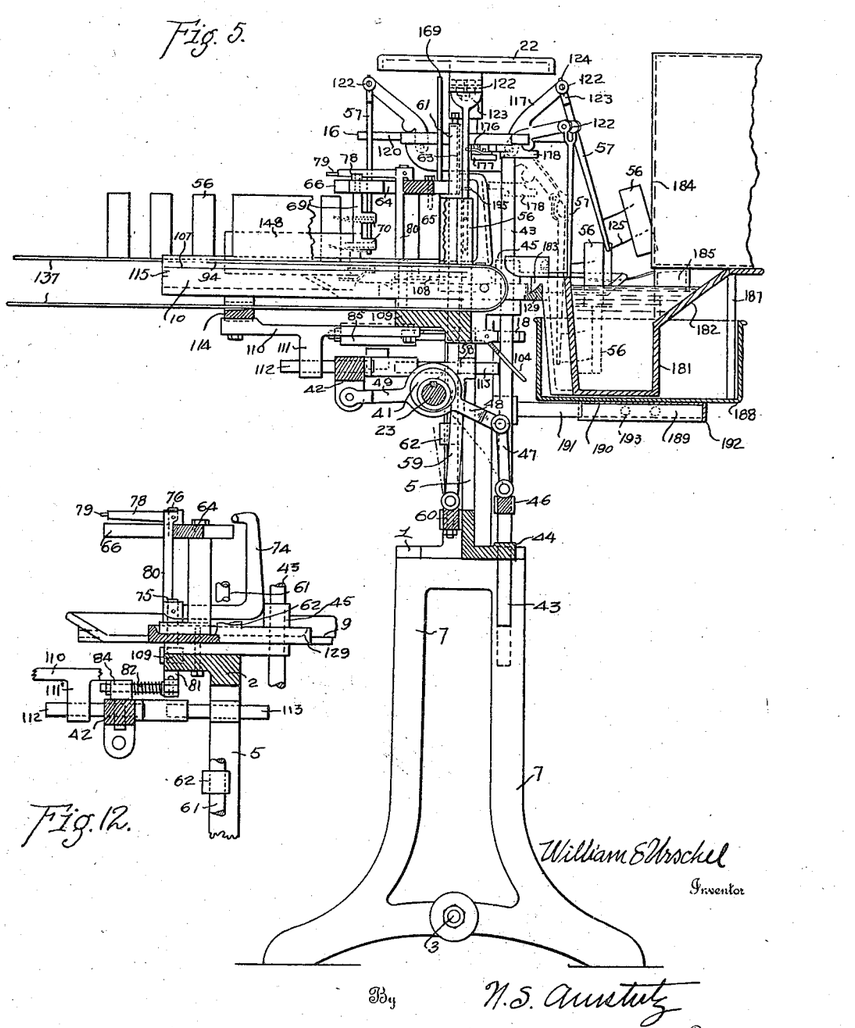
Fig. 5 (Sheet 4) is a side elevation in section.
Fig. 12 (Sheet 4) is an elevation partly in section showing the means for actuating the member illustrated in Fig. 11.

The machine comprises a rectangular skeleton frame having a base 1, Figs. 1, 4 and 5, and a top member 2 which are joined together by vertical members, a right hand one 3 and a left hand one 4 and in addition two members 5 and 6 respectively located on each side of the center of the machine as seen in the elevations of Figs. 1 and 4. The base 1 is supported by a pair of legs 7 that are held separated at the bottom by a tie rod 8.

Figure 2:
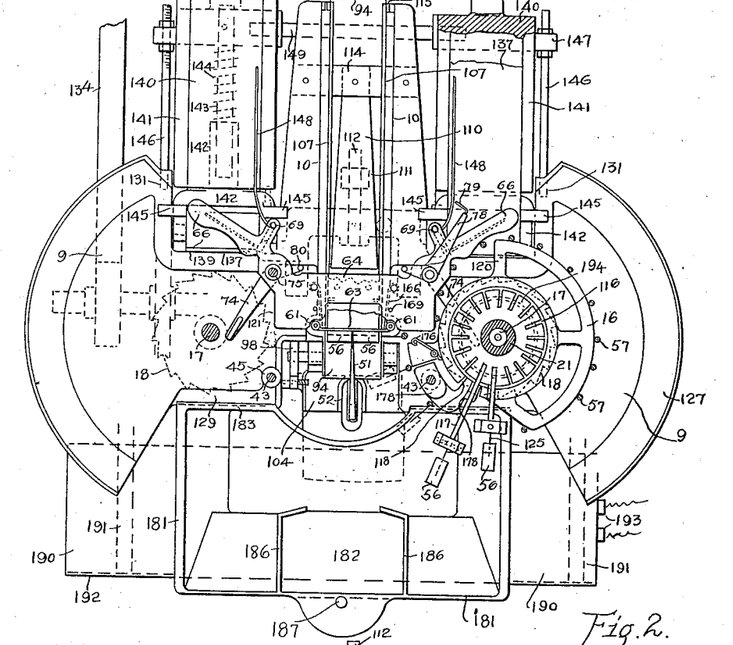
Fig. 2 (Sheet 2) is a top plan view showing parts broken away, only the right hand group of carriers in their operative relation being indicated.
Figures 7, 17, 18, 19, 20, 21:
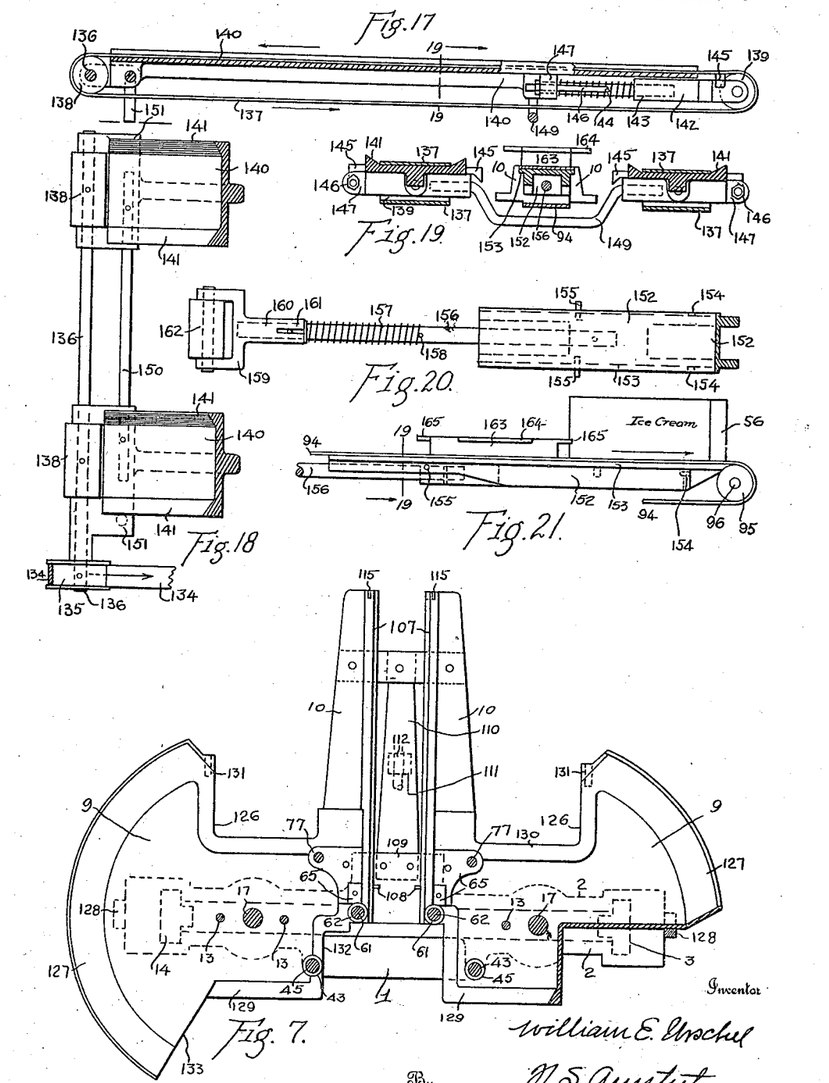
Fig. 7 (Sheet 6) is a top plan view of the related portions of the frame with the actuating mechanism removed.
Fig. 17 (Sheet 6) is an elevation in section of one of the delivery belts.
Fig. 18 (Sheet 6) is a plan view of the rear end portion of the delivery belt mechanism, shown in Fig. 17.
Fig. 19 (Sheet 6) is a cross section of Figs. 17 and 21 on lines 19.
Fig. 20 (Sheet 6) is a plan view of the rear portion of the feeding belt mechanism.
Fig. 21 (Sheet 6) is a side elevation of the front end of the feeding belt mechanism.

On top of the frame member 2, a pair of pan shaped castings 9 are placed, one on each side of the central position of the machine, to catch any drippings of chocolate (Figs. 1, 2, 4, and 7, especially the latter). Each of the castings 9 has a rearward projection 10, as shown in Figs. 2, 5 and 7, to form supporting and guiding means for the feeding belt mechanism. On top of the castings 9 a pair of standards 11 are placed. These standards have an enlarged base 12 by means of which they, and the castings 9, are secured to the top portion 2 of the main frame by suitable bolts 13 as shown in Fig. 4.

At their upper ends the standards 11 are also enlarged to form cup-shaped receptacles 14 which are surrounded by flanges 15 on which the track rings 16 rest. Vertical shafts 17 pass through the standards 11. They depend below the upper member 2 of the main frame to receive ratchet disks 18. The upper ends of shafts 17 are reduced in diameter to receive the two part heads 19, shown in Fig. 4. These heads are held in place by suitable nuts 20 threaded on the shaft extensions 21. Above the nuts 20 the shaft extensions are of slightly smaller diameter to receive the removable tables 22.

Figure 3:
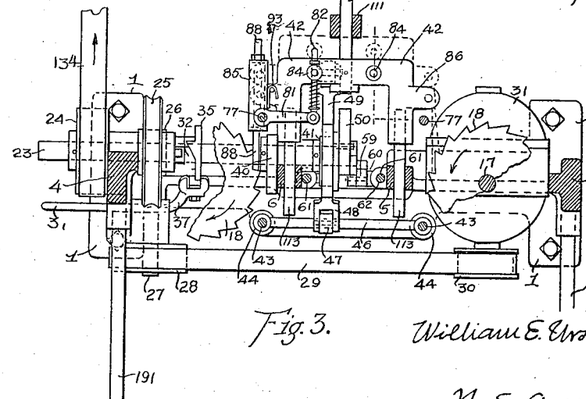
Fig. 3 (Sheet 2) is a top plan view of the under portion of the machine showing the driving mechanism.

The main frame on the uprights 4 and 6 supports the driving shaft 23. This shaft projects outside of the member 4 and beyond the member 6, as shown in Figs. 1, 3 and 4. It carries at its outer end a pulley 24 for operating the delivery belts, and on the inner side of the member 4 a worm gear 25 loose on the shaft. This worm gear meshes with a worm 26 beneath it. The worm itself is on a right angled shaft 27 that has bearing in an inner projection of the member 4, as shown in Figs. 1, 3 and 4. The shaft 27 at its outer end has a pulley 28 which carries a belt 29 that connects it with the pulley 30 of the motor 31 mounted on the lower member 1 of the main frame, as shown in Fig. 1.

The shaft 23 is set in motion when the finger of the clutch 32 engages a pin 33 on the hub of the worm gear 25. The clutch finger 32 is a part of a ring slidable on a spline 34 of the shaft 23. It has an annular flange 35 which is engaged by the fork 36 of the shift lever 37 fulcrumed at 38 to the member 1 of the main frame. A pin 39 or any other expedient serves to hold the shift lever in its on and off positions.

A came 40 for intermittently moving the feed belt is mounted on the shaft 23 between members 4 and 6 adjacent the latter member. On the other side of the vertical member 6, an eccentric 41 is secured to the shaft 23 which operates the slide 42 for rotating the pie carriers and also for impaling the ice cream portions onto the carriers and through the same mechanism removing the finished pies from the carriers. This eccentric also operates the vertically movable rods 43 that lower the ice cream into the dipping pan and also thereafter raise the coated ice cream out of the melted chocolate.

The rods 43 have bearing in the frame member 1 at 44 and on the castings 9 in their bosses 45. A cross bar 46 connects the rods 43 above the bearings 44, and a link 47 connects the eccentric lever 48 to the bar 46. In a similar way, the other eccentric lever 49 is pivotally connected to the side 42 so that as the eccentric 41 rotates, the slide is moved to and fro by the lever 49 and the rods 43 are moved up and down by the lever 48 once during each revolution of the shaft 23.

Figures 6, 13, 14, 15, 16, 22:
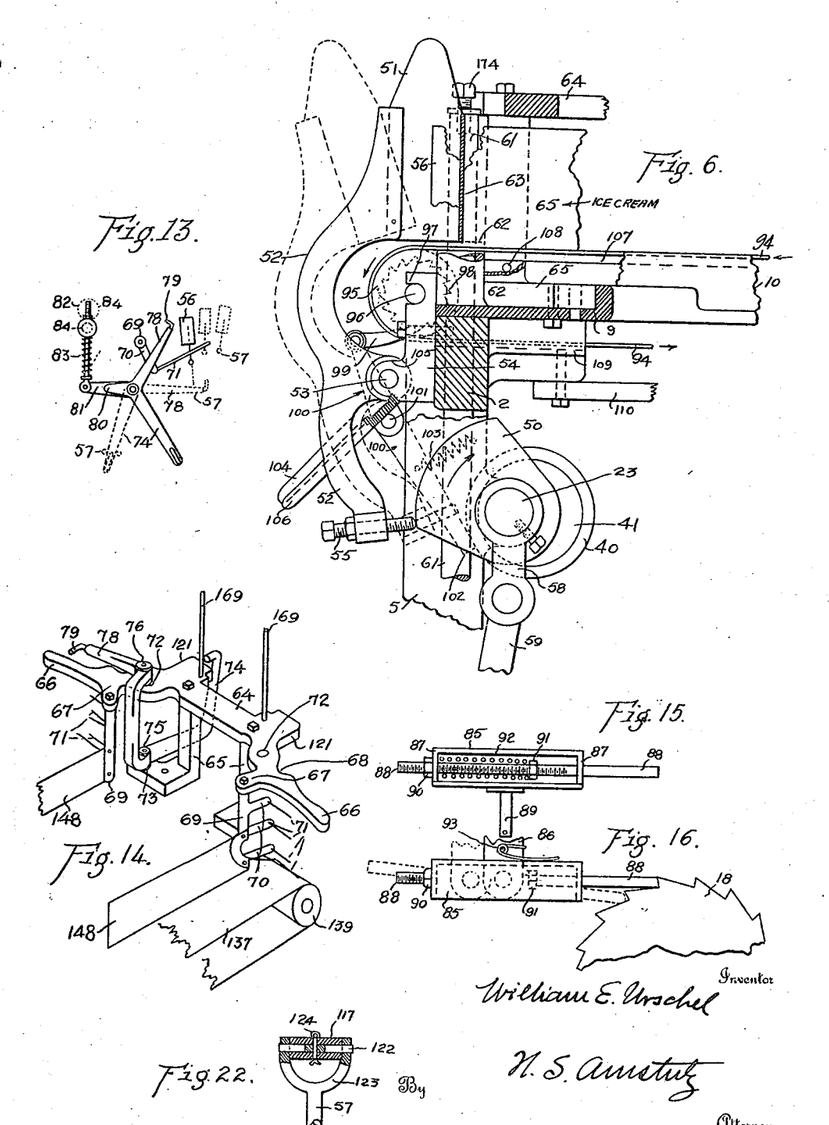
Fig. 6 (Sheet 5) is an enlarged elevation in section of the cutting knives and their actuating mechanism.
Fig. 13 (Sheet 5) is a diagrammatic plan view illustrating the delivery of the finished product.
Fig. 14 (Sheet 5) is a perspective view of a rear portion of the machine.
Figs. 15 and 16 (Sheet 5) are respectively a side elevation and plan view of the actuating pawls used to rotate the groups of carriers.
Fig. 22 (Sheet 5) is a detached elevation in section of the pivotal support of one of the carriers.

A came 50 is mounted on the shaft 23 adjacent the eccentric 41, (see Figs. 3 and 6). It serves to move the vertical dividing knife 51 to and fro so as to divide a slab of ice cream into two parts 56 (see Figs. 2 and 6). The dividing knife 51 is attached to the curved lever 52 which is pivoted at 53 to the casting 54 as shown in Figs. 1 and 6. The lower end of the lever 52 is provided with an adjustable set screw 55 that bears on the cam 50. This lever follows the contour of the cam 50 as the knife 51 is withdrawn by gravity from its cutting position after the ice cream portions 56 have been picked up by the transferring carriers 57.

Adjacent the cam 50 a crank 58 is secured to the extreme inner end of the shaft 23. This crank is connected by a link 59 to a cross bar 60 which at their lower ends join the two vertical rods 61 that slide up and down in bearings 62 of the castings 9. At the upper ends of the rods 61, the slab or transverse cutting knife 63 is secured. From this it will be seen that as the shaft 23 rotates, the crank 58 will raise and lower the knife 63, once for each revolution of the shaft.

What may be called a balcony frame 64, shown in Fig. 14, is supported on two standards 65 which are respectively secured to the castings 9. This balcony frame 64 has side wise extensions 66 and rearward projections 67. Between the extension 66 and the main portion of the frame 64, a curved guiding or guarding edge 68 is formed which serves to hold the carriers 57 in place as they move toward the assembling position. Side edges 21 of the frame 64 finally guide the carriers 57 into their assembling position, as shown in Fig. 4, so that the needles 125 in passing do not engage the standards 65.

From the rearward projection 67, finger posts 69 depend. They carry fingers 70 to which stripping wires 71 are fastened at about right angles thereto. These wires serve to hold the completed product while the needles 125 are withdrawn by the arm 78 moving the companion carrier 57 radially on its pivot pin 122 so as to withdraw the needles 125 from the product. This then leaves the product resting on the delivery belt 137 where it is guarded from accidentally falling toward the feeding belt 94 by a guard plate 148.

The impaling of the needles 125 into the severed portions 56 of ice cream and subsequently withdrawing the needles from the coated ice cream is performed by means of the same device which comprises a vertical connecting member 80 that has two lateral projections for the pivot pins 75 and 76 (see Fig. 11). The pivot pin 76 has bearing in the openings 72 formed in the frame 64, as shown in Fig. 14, and opening 73 in the base of the standard 65 forms the pivot for the vertical stem 77 that passes downward through the base of the standard 65 and the casting 9, where it terminates in an actuating arm 81.

From the pivot point 75, the horizontal portion of the arm 80 extends forward and thence upward to form the impaling arm 74. From the pivot point 76, a curved arm 78 projects sidewise which terminates in a guard pin 79. The purpose of the guard pin 79 is to prevent the carriers 57 falling behind the arm 78, which if not prevented would lock the machine. The pivot point 76 and the arm 78 function above the balcony frame 64 while the pivot point 75 functions below the frame 64. For the same movement of the actuating arm 81 the rocker arm or connecting member 80 with its attached extensions 74 and 78 performs two distinct operations.

Figure 10:
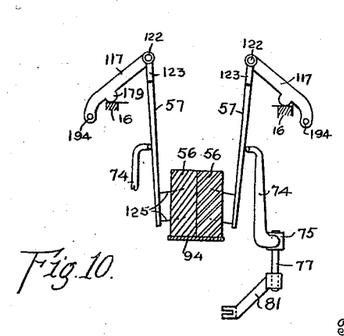
Fig. 10 ( Sheet 3) is a diagrammatic elevation showing how the depending carriers are moved toward the severed portions of ice cream.
Figure 11:
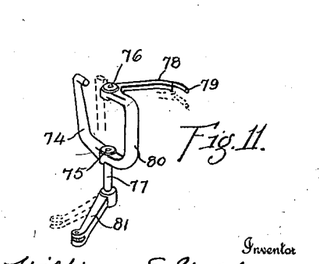
Fig. 11 (Sheet 3) is a perspective view of the actuating mechanism for loading and delivering the severed portions of ice cream onto and off from the depending carriers.

When the arm 81 moves forward, as shown in dotted lines on Fig. 11 which is a detached perspective view of the left hand member shown on Fig. 4, the extension 74 pushes a carrier 57 toward a severed piece of ice cream 56 and impales the needles 125 into the ice cream, as shown in Fig. 10. While the arms 74 are moving their respective carriers 57 toward the blocks of ice cream, the arms 78 are moving away from such carriers 57 as are in front of them. On the reverse movement of the arms 81, the extensions 78 engage the adjacent carriers 57 pushing them inwardly in a radial direction so as to withdraw the needles 125 from the finished product as it is held by the wires 71. At the same time the arms 74 are impaling uncoated portions of ice cream 56 onto the needles 125.

The dual function of the rock arm 80 is due to the fact that the extensions 74 and 78 are on opposite sides of the pivot centers 75 and 76 and the movement of these parts is effected by the eccentric 41, eccentric arm 49 and the slide 42. This slide is connected to the arms 81 by means of elastic connections shown in Figs. 12 and 13 in which the spring links 82 join the ends of the arms 81 to the blocks 84 pivoted on the slide 42. The links 82 pass loosely through the blocks 84 and they terminate in threaded ends, on which limit and tension adjusting nuts are placed. Between the blocks 84 and the arms 81 coil springs 83 are placed around the links 82. These springs prevent the jamming or injuring of the machine should, for any reason, any of the operating parts become obstructed.

The slide 42 is also provided with means for simultaneously operating the ratchet disks 18 which rotate the two sets of carriers 57 in opposite directions. This is effected by pivotally connecting the stems 89 of the spring pressed pawls 85 to the ears 86 extending sidewise from the slide 42. The pawls 85 are self compensating. They have end walls 87 through which the push rods 88 pass loosely. Nuts 90 form limit stops for the rods so that the springs 92 are held within bounds. The tension of the springs 92 is controlled by means of the nuts 91 that are threaded on the rods 88. The forward ends of the rods 88 are made to engage the teeth of the ratchet disks 18, shown in Fig. 16, by means of springs 93. As the slide 42 is moved to and fro by the eccentric 41 it is supported by guide rods 112 and 113. The forward rods 113 slides in the vertical frame members 5 and 6 and the rear rod 112 slides in the depending boss 111 of the feeding belt supporting frame 110.

The feeding belt 94 is stretched taut on the front removable roller 95 rotatable on its spindle 96 and the rear tension roller 162. The belt slides on the flat top surface of the removable belt frame 152, shown in Figs. 20 and 21. This frame is made removable so that the belt can be easily taken off to wash the parts whenever necessary. In doing this the frame 152 is pulled rearward within the two side guides of the frame 10 shown in Fig. 4. Before the frame 152 can be taken off the belt must be loosened by pressing on the roller 162 against the tension of the spring 157 when the belt is easily slipped sidewise, from off the roller 162, and the frame 152 is withdrawn without difficulty.

The frame 152 is positioned at its front end in the adjacent inner walls of the castings 9, by pins 108 engaging recesses 154 of the belt frame 152. The rear end of this frame is positioned by pins 155 projecting from its sides as they engage slots 115 of the extensions 10, shown in Fig. 5. It will be seen from Figs. 6, 19 and 20 that the belt frame has side projections 153 throughout its length. These rest on ledges 107 of the extensions 10 and together they serve to hold the belt frame in horizontal position. When the belt 94 is to be entirely removed from the machine it is done by taking the front roller 95 away from its slotted bearing 97 shown in Fig. 6.

If it is desired to increase the tension on the feeding belt 94, the spring 157 may be compressed more on the rod 156 and then held by the pin 158 placed in another hole (not shown) of the rod 156. The roller 162 is supported by the forked casting 159 which has a tubular extension 160 in which the rod 156 slides. A slot 161 in the extension 160, a cooperating pin on the rod 156 and the rigid fastening of the rod on the under side of the belt frame 152 serve to hold the roller 162 from turning around the axis of the rod 156.

The feeding belt 94 is intermittently moved forward with its block of ice cream by means of a ratchet wheel 98, shown in Figs. 1 and 6, attached to the spindle 96 of the roller 95. A rock arm 100 fulcrumed at 101 has its long arm 102 held in engagement with the cam 40 by a spring 103. The upper end of the arm 100 carries a spring pressed pawl 99 which engages the teeth on the under side of the ratchet 98. Thus as the shaft 23 and cam 40 rotate, the ratchet 98 and the feed belt are periodically moved to bring a new portion of ice cream under the severing knife 63. In order that the block of ice cream is firmly held in place on the belt 94 an aluminum casting 163 is placed on the belt to the rear of the ice cream, as shown in Fig. 21. End fins 165 engage the ice cream with a minimum area so as to prevent undue melting of the ice cream at this point and side fins 164 serve as limit stops by engaging the standards 65 so as to prevent the casting 163 being drawn under the knife 63.

The dividing knife 51 attached to the arm 52 is actuated by the cam 50 as hereinbefore described. The lower end of the arm 52 has free clearance movement in the slot 106 of the drip casting or chute 104, as it is rocked on its pivot bearings 105 formed on the casting 54, shown in Fig. 6. This casting also supports the roller 95 and the rock arm 100.

In order that the feed belt frame 152 and the rearward extension 10 of the castings 9 may be adequately supported, an under frame 110 at its rear end is fastened to a cross bar 114, which is secured to the extensions 10. At its front end the frame 110 is attached to the under side of the recess portion 109 of the main frame 2. In Fig. 5 it will be noticed that the cross bar 114 is beveled off rearwardly. This is done to continuously scrape off the belt 94 on its back travel, thus keeping it quite clean.

Each one of the carriers 57 at its upper end has a yoke 123 formed thereon, in the ears of which a detachable pivot pin 122 is placed. Between the ears the outer end of a lifting arm 117 is held by the pivot pin 122 and the pivot pin is held in place on the arm 117 by a cotter pin 124, shown in Fig. 22. It will of course be seen that there are eighteen of these carriers with their attached arms 117 above each standard 11. The arms 117 each have an enlargement 179 on its under side which forms a shoe adapted to slide on the circular tracks 16 as the arms with their attached carriers are rotated through the movement of the two-part heads 19 attached to the shaft 17 actuated by their ratchet disks 18.

The heads 19 have radial slots 116 in which the lower ends of the lifting arms 117 are pivoted at 119 on a split wire ring 194. The split ring 194 is seated one-half in each of the two sections of the heads 19. In other words, the upper and lower parts of each of the heads 19 have a half round annular groove formed in their adjacent faces to hold the pivot ring 194 when the two parts of the head are clamped together by the nut 20, thus securing the ring 194 between them with the arms 117 freely pivoted on the ring 194 while such arms are held spaced apart from each other in the radial slots 116. The arms 117 and heads 19 are assembled as follows. Each one of the rings 194 has "threaded" thereon its quota of arms 117—eighteen in number—after which the arms 117 are one by one successively placed in the slots 116 of the lower section of a head 19 mounted on the spindle 17, and when the entire number of arms are so positioned, then the upper portion of the head 19 having companion slots 116 is placed on top of the lower portion where it is held, as above stated, by a nut 20 threaded on the reduced diameter 21 of the spindle 17.

The position of the carriers 57 in their round and round travel is controlled by the tracks 16 which are discontinuous radially and vertically and in addition are placed different distances from the center of the spindles 17. In the right hand portion of Fig. 2 the right hand part of the track 16 is of greater radius than the left hand portion, the change in radius occurring at the point 120, which point is the delivery position where the finished product is removed from the needles 125 when the arm 66 moves a carrier 57 radially toward the spindle 17. This movement of the carrier is permitted by the radial portion 120 of the track 16.

As the carriers 57 successively pass from the delivery position near the radial track 120, they depend freely from their pivot pins 122 by gravity, being carried along the irregular edge of the balcony frame 64 so as to keep the needles 125 from engagement with any of the adjacent parts of the machine, finally arriving at a position in front of the balcony frame 64. After the carriers leave the edges 121 of the frame 64 they are moved by the arms 74 past guard springs 176, shown in Fig. 2, (one spring for each half of the machine) so as to push the needles 125 into the severed portions of ice cream 56.

From this point the carriers hang substantially vertically as they are moved toward the dipping position defined by the notches 118, shown in Fig. 1. These notches permit the arms 117 to successively drop downward to lower the carriers 57 and the attached ice cream into the dipping pan 181, as shown in dotted lines of Fig. 5. As the arms 117 reach the notches 118 they first drop so that their shoes 179 rest on the T heads 178 secured to the upper ends of the dipping rods 43; then as the rods are lowered by means of the eccentric 41, eccentric arm 48 and the link 47, heretofore referred to, the carriers 57 are gradually lowered into the liquid chocolate and are almost immediately again withdrawn from the chocolate by the upward movement of the rod 43.

As soon as the carriers 57 are again raised, they continue their rotary travel which brings them against the tangential portion of the track 16, shown in Fig. 1, which gradually leads the carriers outward so as to rest against the increased radius track 16, at an angle, as shown in Fig. 1, thus allowing the coated ice cream to drip from its lower corner. To catch such drippings the castings 9 are flared up and outward at 127, as shown in Figs. 1, 2 and 4. On the rear side of the castings or pans 9, notches 126 are formed, as shown in Fig. 7. These notches accommodate the delivery belts 137 and their attached supports 140.

The pans 9 are held on the top of the frame 2 by means of bolts 13 heretofore described, and in addition are held against sidewise displacement by depending lugs 128. These pans 9 along their front edge have beveled portions 129 formed thereon, on which the overhanging lips 183 of the dipping pan 181 rest. Along the inner portion and sides of the recesses 126, beveled edges 130 are formed to prevent drippings leaving the pans 9, and also to form seats for hooks 145 of the delivery frames 140 to rest on. At the front of the left hand pan, shown in Fig. 7, it is cut away at 132 to form a clearance for the feed belt ratchet 98.

As already stated, the delivery belt frames 140 rest on the beveled edges 130 of the castings 9; and in addition, adjustable side rods 146 pass into openings 131 of the castings 9, as shown in Fig. 2. The frames 140 have upwardly beveled sides 141, between which the delivery belts 137 pass rearward while resting on the flat portion of the frame. The belts 137 are kept under tension by a movable forked portion 142 between the forks of which the front roller 139 is placed. This member has hooks 145 which rest on the beveled edges 130 of the recesses 126 of the castings 9. The part 142 has a rod 143 secured therein. This rod passes through a central flange, beyond which a limit nut is threaded thereon. A coil spring 144 is placed between the part 142 and the central flange referred to. These springs keep the belts 137 under tension at all times.

At the rear end of the frames 140 the rollers 138 are secured to a common shaft 136, which shaft drives both delivery belts 137 at the same speed by means of a pulley 135 attached to the outer end of the shaft 136 and a belt 134 which is driven by the pulley 24 secured to the outer end of the main shaft 23. The guide rods 146 are threaded at their rear ends, freely passing through the ears 147 where they are held by lock nuts, as shown in Fig. 2. The two frames 140 are held spaced apart near their front end by a depending rod 149, and at their rear end by a tie rod 150 placed parallel to the driving shaft 136, as shown in Figs. 17, 18 and 19 of sheet 6. Any desired form of supporting legs 151 placed at the rear ends of the frames 140 may rest on any suitable table, not shown, to support the frames 140 horizontally and such a table also affords a wrapping space for the finished product.

Castings 9 are cut away diagonally at 133, as shown in Fig. 7, to accommodate the dipping pan 181, also shown in Fig. 2. This pan consists of a sloping entry wall 182 having horizontal side walls 186, on which the chocolate can 184 may rest so that its nozzle 185 will be located above the sloping wall 182 and between the side walls 186. As already stated, the dipping pan 181 rests on the beveled edges 129 of the castings 9. The front end of the dipping pan 181 is supported by a rod 187, as shown in Fig. 5. This rod rests on the bottom of the water pan 188. In order to prevent the carriers 57 from swinging sideways just before entering the dipping position, suitable guard plates may be provided if found necessary, and in order that the feed ratchet 98 may be protected from drippings, a guard plate 180, shown in Fig. 1 may be used.

The dipping pan 181 is supported on the water pan 188, and this in turn rests on a long electric heating plate 190 in which an electric element 189 is placed to which service terminals 193 are connected. A front flange 192 determines the distance the heating plate 190 can be pushed onto the supporting rods 191. Stop pins 195, shown in Fig. 1, may be placed in advance of the carriers 57 to limit the distance that the carriers may be pushed toward each other.

Should there be a tendency for the severed slab of ice cream to follow the knife 63 on its upward travel, I may use a gravity weight 167, shown in Figs. 8, 9$^A$ and 9$^B$. This weight has vertical grooves 168 on each side, which grooves form ways for the guide rods 169. The weight 167 has side ledges 172 which form stops that rest on the balcony frame 64 when the knife 63 is in its lowest position. It also has a forwardly projecting flange 173 and a plate 170 attached thereto, which plate has a slot 171 formed in its lower foot-shaped end. The slot 171 is to provide clearance for the knife 51.

Between the plate 170 and the toe-shaped bottom of the weight 167 the knife 63 has movement in a vertical direction, as shown in Figs. 9$^A$ and 9$^B$. The weight 167 is not raised by the knife 63 until the knife in its upward movement has passed over the dimension 175, shown in Fig. 9$^A$, when the adjusting screws 174, shown in Fig. 9$^B$, abut the under side of the flange 173, thus raising the weight 167 so that the block of ice cream can be moved forward into a new position without interference from the weight 167.

Guard plates 166, shown in dotted lines on Fig. 2, are placed on each side of the path of the feeding belt 94 so as to prevent any accidental sidewise displacement of the block of ice cream at this point. The guard springs 176, shown in Figs. 1 and 2, are supported on brackets 177 attached to the flanges 15 of the cup-shaped receptacle 14.

What I claim is:

1. An automatic ice cream cutting and dipping machine, comprising means for intermittently moving a block of ice cream into a severing position, a severing knife, means for actuating the severing knife across the block of ice cream so as to separate a slab of ice cream from said block, a dividing knife adapted to divide the slab of ice cream into two parts, a plurality of carriers placed in operative relation on each side of the block of ice cream, means for transferring the divided portions of ice cream separately to a pair of carriers, a dipping pan for liquid coating material, means for lowering the divided portions of ice cream into said dipping pan, means for removing said portions therefrom, means for automatically carrying the coated ice cream portions to delivery positions, and means for successively removing the finished product from succeeding carriers.

2. An ice cream machine, comprising means for severing a slab of ice cream from a block of cream, means for dividing the slab in two portions, means for moving the divided portions away from each other, a container for coating material means for transferring the portions to the coating material, and means for thereafter removing the same to a delivery position.

3. An ice cream machine, comprising means for severing a slab from a block of ice cream, means for dividing the slab, means for moving the divided portions away from each other, a container for coating material, means for transferring the portions to the coating material, means for thereafter carrying the same to a delivery position, and means for subsequently delivering the coated portions.

4. An ice-cream machine, comprising means for severing a slab from a block of ice cream, means for dividing said slab, a container for coating material, means for transferring the portions separately to the coating material, means for timing the setting of the coating while carrying the coated portions freely suspended in spaced relation to each other to a delivery position, and means for subsequently delivering the finished product.

5. An ice cream cutting machine, comprising feeding means, delivery means adjacent the latter, a plurality of severing means adjoining the feeding means, groups of transferring means located on each side of the feeding means, coating means positioned between the severing and delivering means, and means for actuating the several means in coordinate relation to each other.

6. An ice cream coating machine comprising a guideway designed to support a block of ice cream, means for intermittently advancing a block of ice cream along said guideway a predetermined distance, means for severing a portion of the ice cream, means for cutting said severed portion into a plurality of smaller pieces of equal size, a plurality of turrets adjacent to the position where said pieces are severed, a plurality of carriers hinged to said turrets, each of said carriers provided with an impaling needle, means for impaling said pieces of ice cream on said needles, a plurality of pans for coating material, means for lowering said carriers on which the pieces of ice cream are held into the coating material, means for withdrawing said pieces of ice cream, and means for moving said coated pieces of ice cream from the impaling needles and delivering said pieces to a suitable delivery position.

7. A cutting machine as defined in claim 6, in which a plurality of carriers are provided on each of said turrets, and wherein said turrets are revolvable in unison for sequentially presenting unloaded carriers to the severing position as fresh pieces of ice cream are produced by the severing means.

8. A cutting machine as defined in claim 6, in which a plurality of carriers are provided on each of said turrets, and wherein said turrets are revolvable in unison for sequentially presenting unloaded carriers to the severing position as fresh pieces of ice cream are produced by the severing means, and having means for synchronizing said turrets with the impaling and removing means.

In testimony whereof I affix my signature.

WILLIAM E. URSCHEL.